(12) United States Patent
Isomura

(10) Patent No.: US 6,393,031 B1
(45) Date of Patent: May 21, 2002

(54) COMMUNICATION APPARATUS, COMMUNICATION INTERFACE SELECTING METHOD AND COMPUTER READABLE MEDIUM

(75) Inventor: Hiroshi Isomura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/141,319

(22) Filed: Aug. 27, 1998

(30) Foreign Application Priority Data

Mar. 3, 1998 (JP) .......................................... 10-051136

(51) Int. Cl.⁷ .............................................. H04B 7/212
(52) U.S. Cl. ...................................... 370/444; 370/463
(58) Field of Search ................................ 370/431, 437, 370/438, 442, 443, 444, 455, 463, 352, 359, 360, 363, 395.42, 395.7, 401, 419, 420; 710/115, 116, 120, 123, 122, 40

(56) References Cited

U.S. PATENT DOCUMENTS

| 4,296,463 A | * | 10/1981 | Dalboussiere et al. | 710/116 |
| 4,485,436 A | * | 11/1984 | Austruy et al. | 710/120 |
| 4,837,677 A | * | 6/1989 | Burrus et al. | 710/101 |
| 4,914,580 A | * | 4/1990 | Jensen et al. | 710/265 |
| 5,172,373 A | * | 12/1992 | Suzuki | 370/438 |
| 5,771,457 A | * | 6/1998 | Tsutsui | 455/463 |

FOREIGN PATENT DOCUMENTS

| JP | 7-245660 | 9/1995 |
| JP | 9-149455 | 6/1997 |
| JP | 9-200298 | 7/1997 |

* cited by examiner

Primary Examiner—Dang Ton
Assistant Examiner—Brian Nguyen
(74) Attorney, Agent, or Firm—Staas & Halsey LLP

(57) ABSTRACT

The present invention introduces a communication apparatus capable of automatically selecting communication interface in accordance with the order of priority set by the selected order setting information. The priority referring process reads the selection criterion set in the selection criterion register, and then reads one order setting script related to a communication destination when the selection criterion is set to "destination" and reads one order setting script related to a time zone containing a time shown by current time information from the timer when the selection criterion is set to "time zone". The selection process checks whether or not a communication is possible every communication interface in accordance the order of priority set by the read order setting script, and selects a communication interface first judged as communication possible. The communication program executes a communication with the destination by using the selected communication interface.

24 Claims, 10 Drawing Sheets

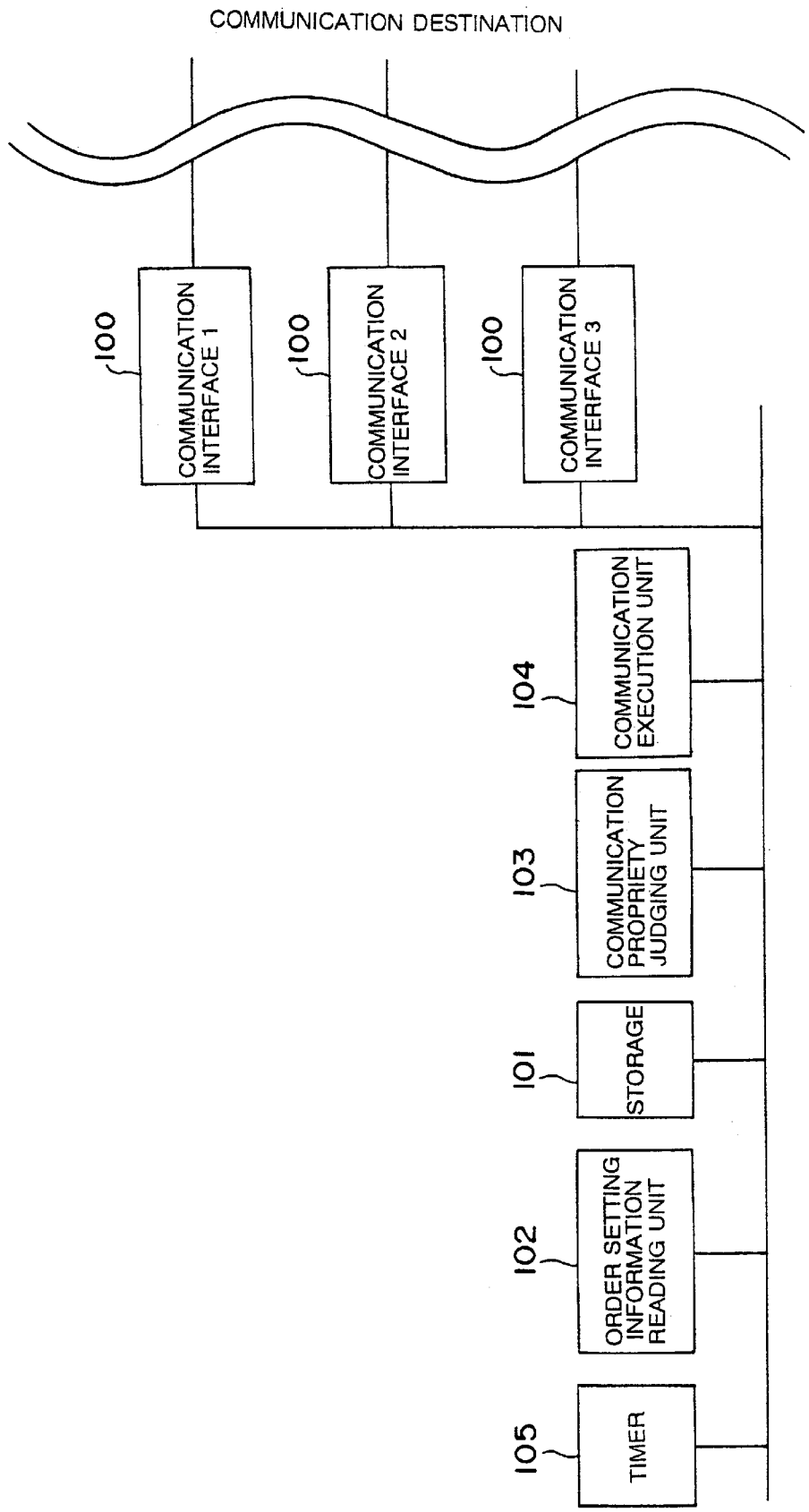

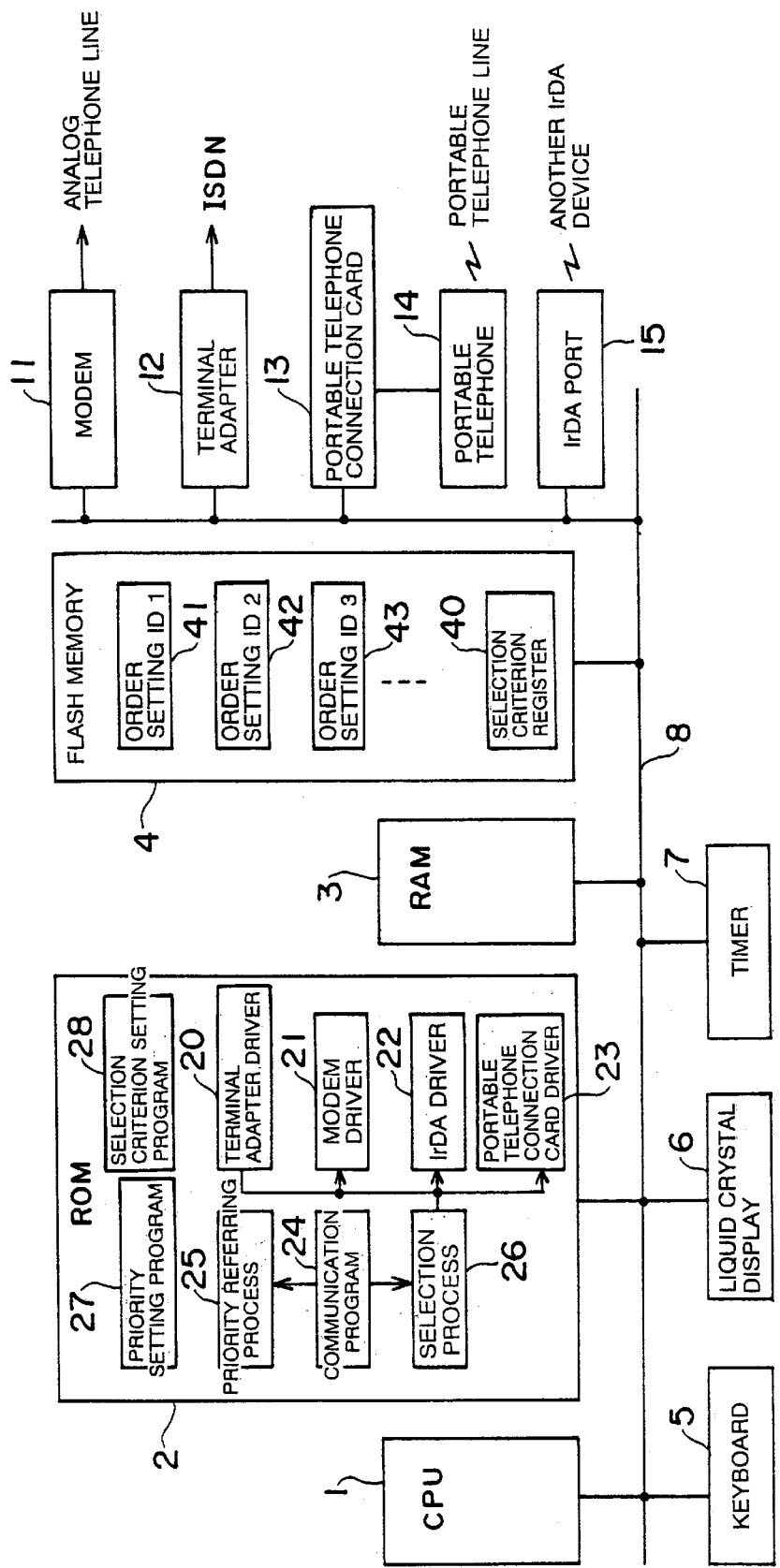

FIG. 3

ORDER SETTING SCRIPT

| ID | 1 |
|---|---|
| SCRIPT NAME | INTERNET CONNECTION (1) |
| TIME ZONE | AM9:00 ~ PM5:00 |
| COMMUNICATION DESTINATION | PROVIDER (1) |
| FIRST PRIORITY COMMUNICATION INTERFACE | TERMINAL ADAPTER |
| SECOND PRIORITY COMMUNICATION INTERFACE | MODEM |
| THIRD PRIORITY COMMUNICATION INTERFACE | PORTABLE TELEPHONE CONNECTION CARD |
| FOURTH PRIORITY COMMUNICATION INTERFACE | IrDA |

ORDER SETTING SCRIPT

| ID | 2 |
|---|---|
| SCRIPT NAME | INTERNET CONNECTION (2) |
| TIME ZONE | PM5:00 ~ AM0:00 |
| COMMUNICATION DESTINATION | PROVIDER (2) |
| FIRST PRIORITY COMMUNICATION INTERFACE | MODEM |
| SECOND PRIORITY COMMUNICATION INTERFACE | TERMINAL ADAPTER |
| THIRD PRIORITY COMMUNICATION INTERFACE | PORTABLE TELEPHONE CONNECTION CARD |
| FOURTH PRIORITY COMMUNICATION INTERFACE | IrDA |

~42 ature. Particularly, computer performing data communication (including portable digital assistants), when provided with a modem, is capable of executing data communication through the conventional analog telephone network, when provided with a terminal adapter, is capable of executing data communication through the ISDN (Integrated Service Digital Network), and when provided with a digital portable telephone connection card, is capable of executing data communication through the digital mobile communication network. Additionally, the computer, when provided with an infrared-ray communication port such as an IrDA port, is capable of executing infrared-ray communication with another computer.

COMMUNICATION APPARATUS, COMMUNICATION INTERFACE SELECTING METHOD AND COMPUTER READABLE MEDIUM

BACKGROUND OF THE INVENTION

1. Field of the Invention

The present invention relates to a communication apparatus and a communication interface selecting method of selecting a communication interface among plural communication interfaces such as analog communication, digital communication and mobile communication, and relates to a computer readable medium.

2. Description of the Related Art

Recently, it becomes possible to communicate by using various communications types with the development of digital switching technique and with the development of radio communication technique. Particularly, computer performing data communication (including portable digital assistants), when provided with a modem, is capable of executing data communication through the conventional analog telephone network, when provided with a terminal adapter, is capable of executing data communication through the ISDN (Integrated Service Digital Network), and when provided with a digital portable telephone connection card, is capable of executing data communication through the digital mobile communication network. Additionally, the computer, when provided with an infrared-ray communication port such as an IrDA port, is capable of executing infrared-ray communication with another computer.

Such various communications types use respective driver programs. Accordingly, when one computer is provided with plural communications types, an user must select a communications type among the plural communications types and must look for a driver program driving the selected communication interface so as to start the driver program, and must re-setup the communication program. Further, when it is impossible to execute the communication using the selected communication interface, the user must select another communications type and start another driver program again. These operations are incidental to the communication which is the purpose of the user, so that these should be finished as simply as possible. Concerning this point, it becomes easier to start a driver program and to set and change a communication program with the recent advance of GUI (Graphical Use Interface) in OS and in communication program, however, the trouble is unchanged in that the user must select a suitable communication interface case by case.

Conventionally, various techniques are introduced, in which the order of priority (priority levels) of communication interfaces is previously set and a communication way is automatically selected in accordance with the order, so as to solve the trouble for selecting the communication interface. For example, Japan Patent Application Laid-Open No. 9-200298 discloses the technique automatically determining the order of priority based on line information. Japan Patent Application Laid-Open No.7-245660 discloses the technique registering the order of priority determined by an user.

Japan Patent Application Laid-Open Nos. 9-200298 and 7-245660 show respectively only one order of priority, however, Japan Patent Application Laid-Open No. 9-149455 shows that plural propriety level tables are provided, each of the tables is used for each purpose (priority is given to a low-priced charge, or priority is given to an uninterrupted call) and the one priority level table can be selected with a simple operation.

Japan Patent Application Laid-Open No. 9-149455 discloses that the plural priority level tables are prepared, however, discloses no reference for selecting one priority level table among these plural priority level tables, so that the user must select one priority level table for communication. Accordingly, the trouble forced the user still remains.

SUMMARY OF THE INVENTION

The present invention has its object to provide a communication apparatus, a communication interface selecting method and a computer readable medium capable of automatically selecting one order setting information among a plurality of order information, each order information setting each order of priority in accordance with a predetermined criterion, and capable of selecting a communication interface in accordance with the order of priority set by the selected order setting information.

The first aspect of the present invention is a communication apparatus comprising, a plurality of communication interfaces, each of the communication interfaces for communicating data with another communication device via each communication path; a storage for storing a plurality of order setting information setting an order of priority of the communication interface used to communicate with the another communication device in relation to each communication device; an order setting information reading unit, when communicating with a specified communication device, for reading the order setting information in relation to the specified communication device from the storage; a communication propriety judging unit for judging whether or not a communication can be executed with each of the communication interface in the order of priority set by the order setting information read by the order setting information reading unit; and a communication execution unit for executing the communication with the specified communication device by using the communication interface first judged by the communication property judging unit as communication possible.

According to the first aspect, when communicating with the specified communication device, the order setting information reading part automatically specifies the order setting information related to the specified communication device among a plurality of order setting information stored in the storage, and reads them. Then, the communication propriety judging unit judges whether or not it is possible to communicate by using the communication part in accordance with the order of priority set by the read order setting information. When there is a communication interface capable of executing communication while the communication propriety determining unit determines sequentially, the communication execution unit executes the communication by using that communication interface.

In this way, according to the present invention, it is possible to prevent a trouble in a case that plural communication interfaces can be used, since it is unnecessary for an user to determine.

The second aspect of the present invention is a communication apparatus comprising: a plurality of communication interfaces, each of the communication interface for communicating data with another communication device via each communication path; a storage for storing a plurality of order setting information setting an order of priority of the communication interface used to communicate with the another communication device in relation to a time zone in which a communication is executed; a timer for indicating a current time; an order setting information reading unit, when communicating with a specified communication device, for reading the order setting information in relation to a time zone including the current time indicated by the timer from the storage; a communication propriety judging unit for judging whether or not a communication can be executed with each of the communication interface in the order of priority set by the order setting information read by the order setting information reading unit; and a communication execution unit for executing the communication with the specified communication device by using the communication interface first judged by the communication property judging unit as communication possible.

According to the first aspect, when communicating with the specified communication device, the order setting information reading part automatically specifies the order setting information related to the time zone containing the current time indicated by the timer among a plurality of order setting information stored in the storage, and reads them. Then, the communication propriety judging unit judges whether or not it is possible to communicate by using the communication part in accordance with the order of priority set by the read order setting information. When there is a communication interface capable of executing communication while the communication propriety determining unit determines sequentially, the communication execution unit executes the communication by using that communication interface.

In this way, according to the present invention, it is possible to prevent a trouble in a case that plural communication interfaces can be used, since it is unnecessary for an user to determine.

The third aspect of the present invention further comprises a display for displaying information specifying a communication device for which the order of priority is set by the order setting information read by the order setting information reading unit.

The fourth aspect of the present invention further comprises a display control unit for controlling the display so as to display information specifying an information device judged by the communication property judging unit with distinction from another information device.

The fifth aspect of the present invention further comprises a display control unit for controlling the display so as to display information specifying a communication judged by the communication property judging unit as communication impossible with distinction from another information device.

The sixth aspect of the present invention further comprises a display control unit for controlling the display so as to display information specifying a communication device judged by the communication property judging unit as communication possible with distinction from another information device.

The seventh aspect of the present invention further comprises an input device through which reject information showing a reject of a communication with the communication means judged by the communication property judging unit, and in the seventh aspect, the communication property judging unit stops a judgment for the communication interface at that time when the reject information is inputted through the input device.

The eighth aspect of the present invention further comprises an input device through which reject information showing a reject of a communication with the communication interface judged by the communication property judging unit as communication possible, and in the eighth aspect, when the rejection information is inputted through the input device, the communication execution unit stops the communication with the communication interface judged as communication possible and the communication property judging unit judges the communication interface of the next order of priority.

The ninth aspect of the present invention is a communication interface selecting method of selecting a communication interface among plural types of communication used in a communication apparatus in order to communicate with another communication device, said method comprising: a step of storing in a storage with order setting information setting an order of priority of the communication interface in relation to each communication device; a step, when communicating with a specified communication device, of reading the order setting information related to the specified communication device from the storage; a step of judging whether or not a communication is possible by using each of the communication interface in the order of priority set by the read order setting information; and a step of selecting the communication interface first judged as communication possible to communicate with the specified communication device.

The tenth aspect of the present invention is a communication interface selecting method of selecting a communication interface among plural types of communication used in a communication apparatus in order to communicate with another communication device, this method comprising: a step of storing in a storage with order setting information setting an order of priority of the communication interface in relation to a time zone in which a communication is performed in a storage; a step, when communicating with a specified communication device, of reading the order setting information related to a time zone containing a current time from the storage; a step of judging whether or not a communication is possible by using each of the communication interfaces in the order of priority set by the read order setting information; and a step of selecting the communication interface first judged as communication possible to communicate with the specified communication device.

The eleventh aspect of the present invention is a computer readable medium storing a program making a computer perform steps, the computer capable of performing plural types of communication with another communication device, these steps comprising: a step of, storing in a storage with order setting information setting an order of priority of the communication interface in relation to each communication device; a step of, when communicating with a specified communication device, reading the order setting information related to the specified communication device from the storage; a step of judging whether or not a communication is possible by using the communication means in the order of priority set by the read order setting information; and a step of selecting the communication interface first judged as communication possible to communicate with the specified communication device.

The twelfth aspect of the present invention is a computer readable medium storing a program making a computer perform steps, the computer capable of performing plural types of communication with another communication device, these steps comprising: a step of storing in a storage with order setting information setting an order of priority of the communication interface in relation to a time zone in which a communication is performed; a step, when communicating with a specified communication device, of reading the order setting information related to a time zone containing a current time from the storage; a step of judging whether or not a communication is possible by using each of the communication interface in the order of priority set by the read order setting information; and a step of selecting the communication interface first judged as communication possible to communicate with the specified communication device.

BRIEF DESCRIPTION OF THE DRAWINGS

Other objects and advantages of the present invention will become apparent during the following discussion conjunction with the accompanying drawings, in which:

FIG. 1 is a view showing an outline of the present invention;

FIG. 2 is a block diagram showing a rough structure of computer used as a communication apparatus according to an embodiment of the present invention;

FIG. 3 is a list showing a structure sample of an order setting script in FIG. 2;

FIG. 4 is a list showing a structure sample of an order setting script in FIG. 2;

DETAILED DESCRIPTION OF THE PREFERRED EMBODIMENT

Figure 5:
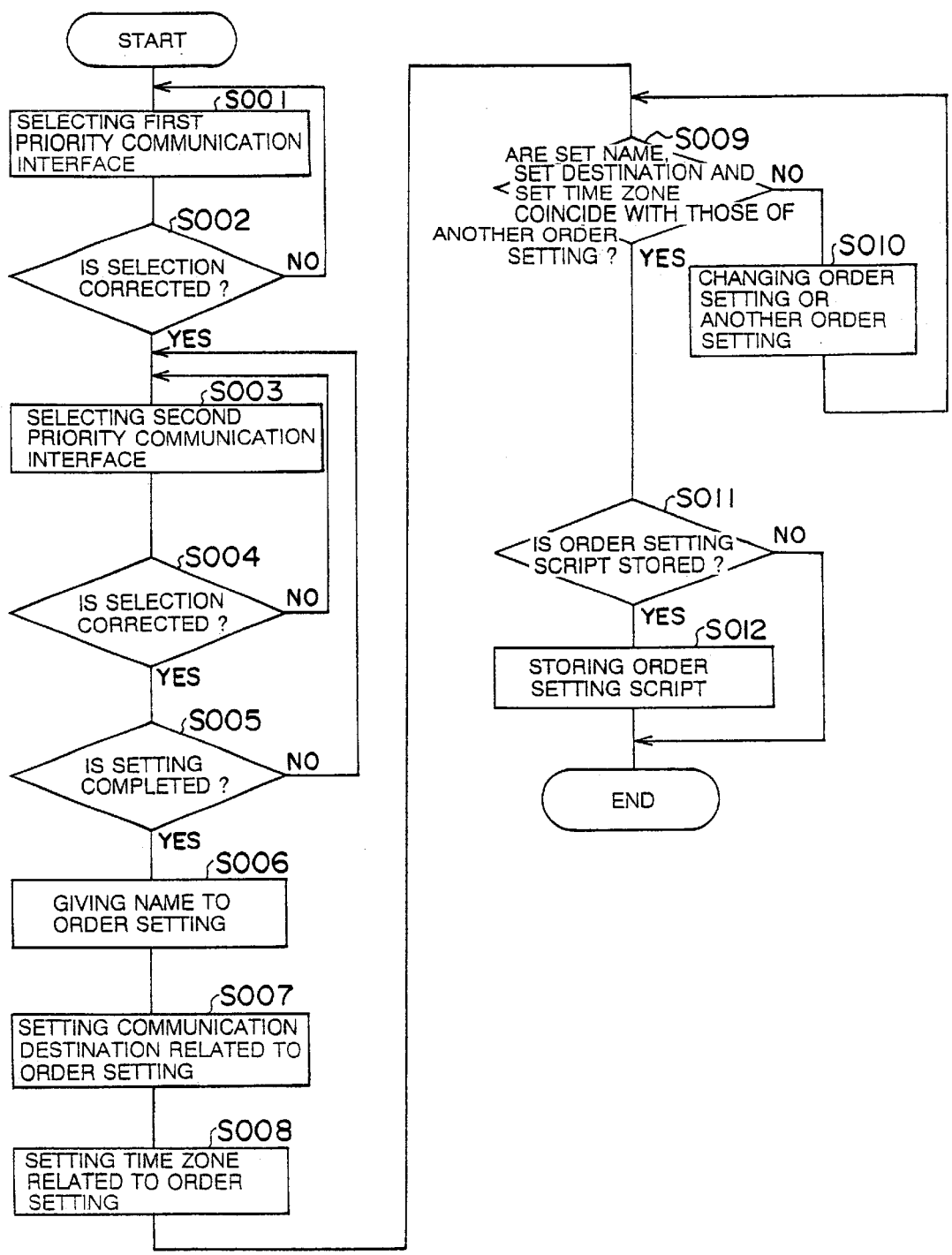
FIG. 5 is a flowchart showing a priority setting process executed by a CPU 1 reading a priority setting program in FIG. 2.

Hereinafter, concrete explanations will be given of an embodiment of the present invention with reference to drawings.

<<Outline>>

First, an outline of the present invention is explained.

As shown in FIG. 1, a communication apparatus according to the present invention is provided with plural communication interfaces 100, each of the communication interface capable of transmitting-receiving data with another communication apparatus via each communication path, a storage 101 keeping a plurality of order setting information in relation to each communication apparatus (or a time in communication), the order setting information setting the order of priority (priority level) of the communication interface 100 used to communicate with another communication device, a timer 105 indicating a current time, an order setting information reading unit 102, when communicating with a specific communication apparatus, for reading the order setting information related to the specific communication apparatus (or a time zone including the current time indicated by the timer 105, a communication propriety determining unit 103 determining whether it is possible to execute communication by using each communication interface 100 in accordance with the order of priority set by the order setting information read by the order setting information reading unit 102, and a communication execution unit 104 executing communication with the specified communication apparatus by using the communication interface 100 first determined by the communication propriety determining unit 103 as possible to communicate.

According to the communication apparatus, when communicating with the specific communication apparatus, the order setting information reading unit 102 automatically specifies the order setting information related to the communication apparatus (or the time zone containing the current time indicated by the timer 105) among a plurality of order setting information kept in the storage 101, and reads it. Then, the communication propriety determining unit 103 determines whether it is possible to execute communication by using each communication interface 100 in accordance with the order of priority set by the read order setting information. During determining by the communication propriety determining unit 103 sequentially, when there is a communication interface 100 determined as possible to communicate, the communication execution unit 104 executes communication by using this communication interface 100. As above described, it is unnecessary for an user to determine a communication unit, therefore, it is possible to prevent trouble when plural communication interfaces 100 can be used.

<<Embodiment>>

Next, explanations will be given of a communication apparatus of an embodiment according to the present invention.

(Computer Configuration)

FIG. 2 is a block diagram showing a rough configuration of computer (portable digital assistant) used as a communication apparatus of this embodiment. As shown in FIG. 2, this computer consists of a CPU 1, a ROM 2, a RAM 3, a flash memory 4, a keyboard 5, a liquid crystal display 6, a timer 7 and an IrDA port 15 connected mutually via a bus 8. This computer is also provided with a card slot based on PCMCIA or the like. Through this card slot, plural communication cards can be connected to the bus 8. Concretely, it is possible to connect the bus 8 with a modem card 11 capable of being connected to an analog telephone line, a terminal adapter card 12 capable of being connected to an ISDN line, and a portable telephone connection card 13 capable of being connected to a digital portable telephone 14.

The CPU 1 is a central processing unit controlling all over the computer by executing various programs stored in the ROM 2.

The keyboard 5 is an input device operated by an user in order to input to the CPU 1 with various commands (a priority setting start command, a selection criterion setting start command, a communication start command, a rejection command or the like) and various data.

The liquid crystal display 6 as a display unit shows information to the user in accordance with the control by the CPU 1.

The timer 7 is a clock indicating a current time and inputting current time information to the CPU 1.

The RAM 3 is a memory capable of being written at any time, in which work areas are developed when the CPU 1 executes various controls.

The ROM 2 is a read only memory as a computer readable medium storing various programs read and executed by the CPU 1. The ROM 2 stores a terminal adapter driver 20, a modem driver 21, an IrDA driver 22, a portable telephone connection card driver 23, a communication program as the communication execution unit (including a priority referring process as the order setting information reading unit and a selection process 26 as the communication property determining unit), a priority setting program 27, a selection criterion setting program 28, and application programs not shown.

The terminal adapter driver 20 is a driver program necessary to activate and to control the terminal adapter card 12 connected to the CPU 1 via the bus 8.

The modem driver 21 is a driver program necessary to activate and to control the modem card 11 connected to the CPU 1 via the bus 8.

The IrDA driver 22 is a driver program necessary to activate and to control the IrDA port 15.

The portable telephone connection card driver 23 is a driver program necessary to activate and to control the portable telephone connection card 13 connected to the CPU 1 via the bus 8.

The priority setting program 27 is a program generating priority setting scripts 41, 42, 43 . . . determining the order of priority showing that the priority is given to one of communication units (the modem card 11, the terminal adapter card 12, the portable telephone connection card 14, the IrDA port 15) every communications partner and every communication time zone, and storing them in the flash memory 4.

The selection criterion setting program 28 is a program determining a selection criterion for selecting one script among the order setting scripts 41, 42, 43 . . . in the flash memory 4 (selecting based on the current time indicated by the timer 7, based on the communication destination, or based on an instruction from the user), and registering the selection reference in a selection reference register in the flash memory 4.

The communication program 24 is a program transmitting data (a file, a communication sentence) generated in the CPU 1 by executing the not-shown application program to the communication destination (host computer, a provider, another IrDA device) through one of communication interfaces 11 through 15, and notifying the application program of the data received from the communication destination through the communication units 11 through 15.

The priority referring process 25 related to the communication program 24 is a routine selecting one of the order setting scripts 41, 42, 43 . . . by the selection criterion registered in the selection criterion register 40 in the flash memory 4, and reading the order of priority described in the selected order setting script 41, 42, 43 . . .

The selection process 26 related to the communication program 24 is a routine selecting one of communication interfaces 11 through 15 used for communication in accordance with the order of priority referred by the priority referring process 25, and starting a driver program corresponding to the selected communication interface 11 through 15.

The flash memory 4 as a storage and as a memory is a data writable ROM keeping the order setting scripts 41, 42, 43 . . . and the selection criterion register 40. FIGS. 3 and 4 show samples of the order setting scripts 41, 42 kept in the flash memory. As shown in FIGS. 3 and 4, each of the order setting scripts 41, 42, 43 . . . is a table (order setting information) containing "ID" arid "script name" of this script, "time zone" in which this script is selected when a script is selected based on a time zone, "communication destination" for which this script is selected when a script is selected based on a communication destination, "first priority communication interface" through "fourth priority communication interface" set by this script. Concretely, FIG. 3 shows the order setting script 41 of ID 1 "internet connection (1)" in which the order of priority is set by giving priority to the communication speed and the communication quality rather than the communication charge, since it is used to connect between a provider (1) and an user who is a member under the name of an employment in working time (AM 9:00 through PM 5:00). FIG. 4 shows the order setting script 42 of ID 2 "internet connection (1)" in which the order of priority is set by giving priority to the communication charge rather than the communication speed and the communication quality, since it is used to connect between a provider (1) and an user who is a member under the own name in at-home time (PM 5:00 through AM 0:00).

(Control Process)

Next, explanations will be given of the control process executed by the computer reading various programs in the ROM 2 with reference to flowcharts of FIGS. 5 through 11.

<Priority Order Setting Program>

FIG. 5 is a flowchart showing a priority setting process executed by the CPU 1 reading the priority order setting program 27.

This priority setting process starts by inputting a priority setting start command through the keyboard 5.

In S001 firstly executed after the priority setting process starts, the CPU 1 selects one of communication interfaces 11 through 15 of the highest order of priority based on the specific information inputted by the user through the keyboard 5.

In the next S002, the CPU 1 check whether a command requiring to correct the communication interface 11 through 15 selected in the S001 is inputted or not by the user. The CPU 1 returns the process to the S001 when a command requiring to correct is input. However, the CPU 1 advances the process to the S003, when no command requiring to correct is not input.

In the S003, the CPU 1 selects one of the communication interfaces 11 through 15 of the second order of priority based on the specific information inputted by the user through the keyboard 5.

In the S004, the CPU 1 checks whether a command requiring to correct the communication interface 11 through 15 selected in the S003 is inputted or not by the user. The CPU 1 returns process to the S003 when a command requiring to correct is input. However, the CPU 1 advances the process to the S005 when no command requiring to correct is inputted.

In the S005, thee CPU 1 checks whether or not the process of S003 is completed for all communication interfaces 11 through 15 for which the priority order should be set by the order setting scripts intended to be produced this time. The CPU 1 returns the process to the S003 when the process of the S003 is not yet completed for all communication interfaces 11 through 15 for which the order of priority should be set. However, the CPU 1 advances the process to the S006 when the process of the S003 is completed for all communication interfaces 11 through 15 for which the order of priority should be set.

In the S006, the CPU 1 names the order setting (order setting script) in the S001 and the S003 based on the specific information inputted by the user through the keyboard 5. Whether or not the specific information is inputted by the user, the CPU 1 gives an identification (ID) number for the order setting script generated this time in accordance with the generated orders.

In the next S007, the CPU 1 sets a communication destination to be related to the order setting (order setting script) in the S001 and the S003 in accordance with the specific information inputted by the user through the keyboard 5.

In the next S008, the CPU 1 sets a time zone to be related to the order setting (order setting script) in the S001 and the S003 in accordance with the specific information inputted by the user through the keyboard 5.

In the next S009, CPU 1 checks whether or not the name set in the S006, the destination set in the S007 and the time zone set in the S008 are coincide with those of the setting script stored in the flash memory 4 (namely, whether or not the same name, the same destination and the same time zone are already set). In the S010, the CPU 1 change the order setting by the S001 and the S003 in S010 or the already stored order setting script when not coincide. The CPU 1 returns the process to the S009 after completing the S010. However, the CPU 1 advances the process to the S011 when judging as coincide in the S009.

In the next S011, the CPU 1 checks whether the order setting script, in which the order setting in the S001 and the S003, the name set in the S006, the destination set in the S007 and the time zone set in the S008 are described, is stored in the flash memory 4 or not. This check is executed in accordance with a storing command inputted through the keyboard 5 by the user. The CPU 1 terminates the priority order setting process promptly when not stored (namely, when no storing command is inputted). The CPU 1 stores this order setting script in the flash memory 4 in the S012, and then terminates the priority setting process, when, storing (namely, when the storing command is inputted).

<Selection Criterion Setting Program>

Figure 6:
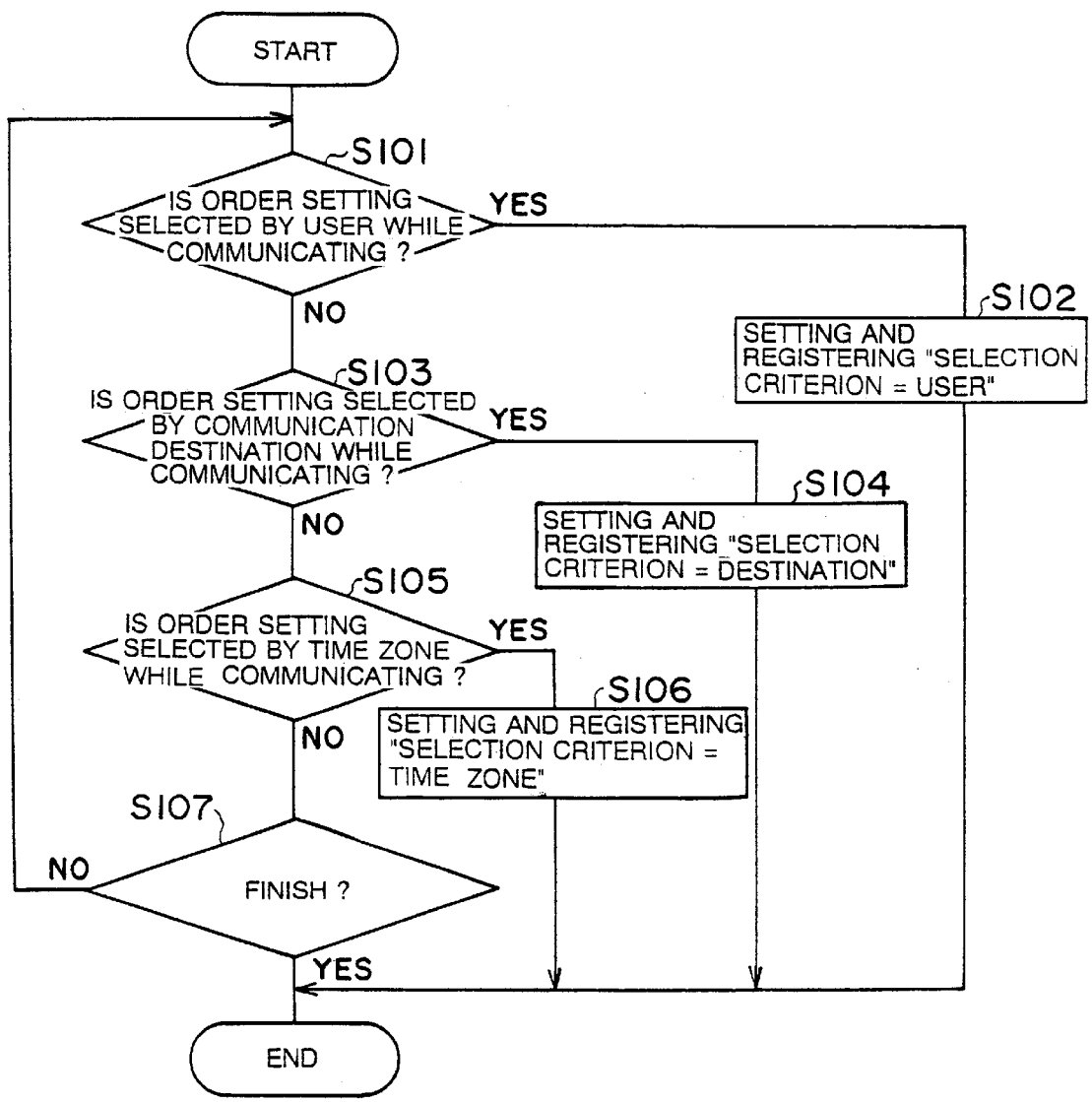
FIG. 6 is a flowchart showing a selection reference setting process executed by the CPU 1 reading a selection criterion setting program in FIG. 2.
Figure 7:
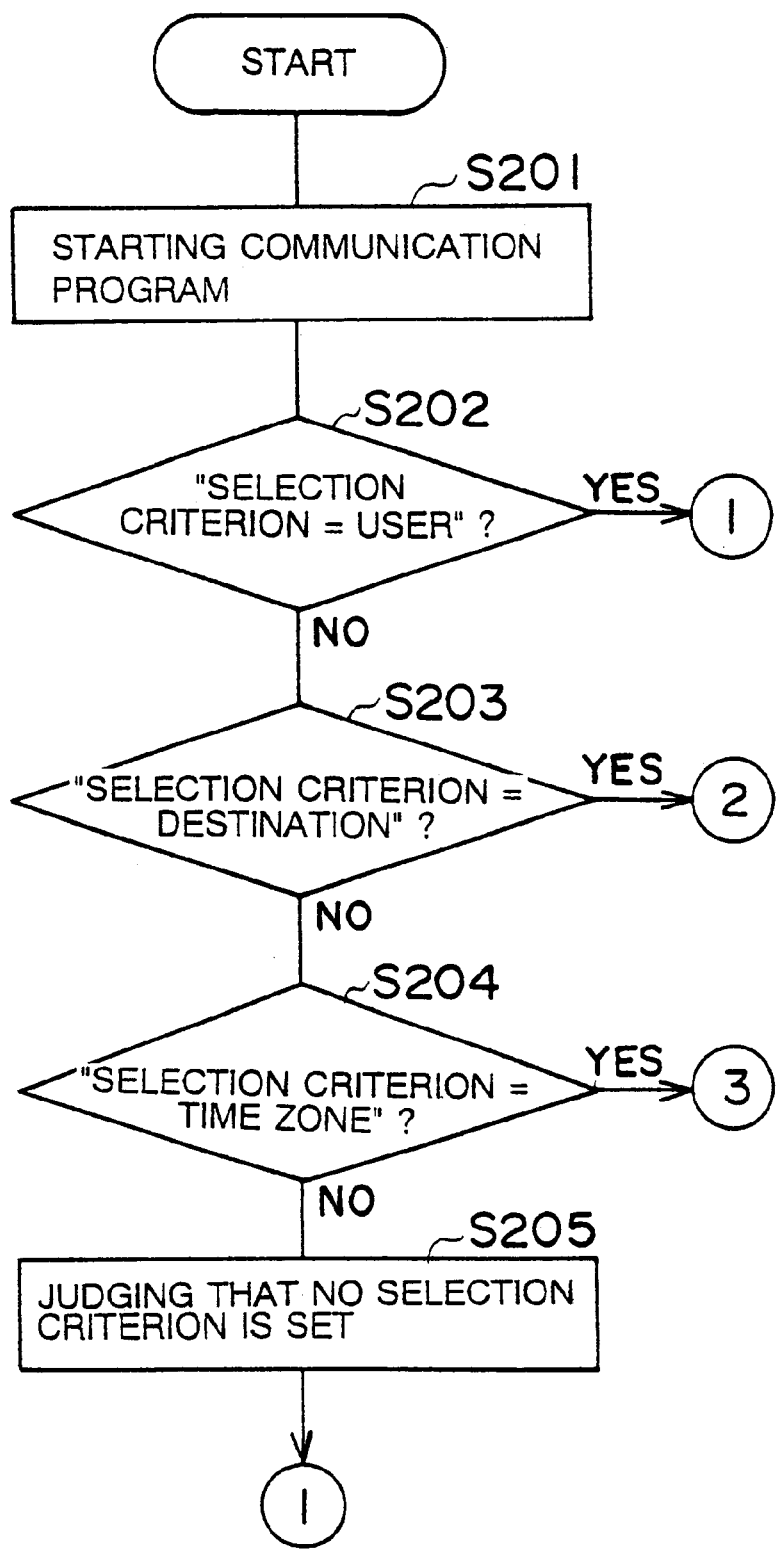
FIG. 7 is a flowchart showing a communication control process executed by the CPU 1 reading a communication program in FIG. 2.
Figure 8:
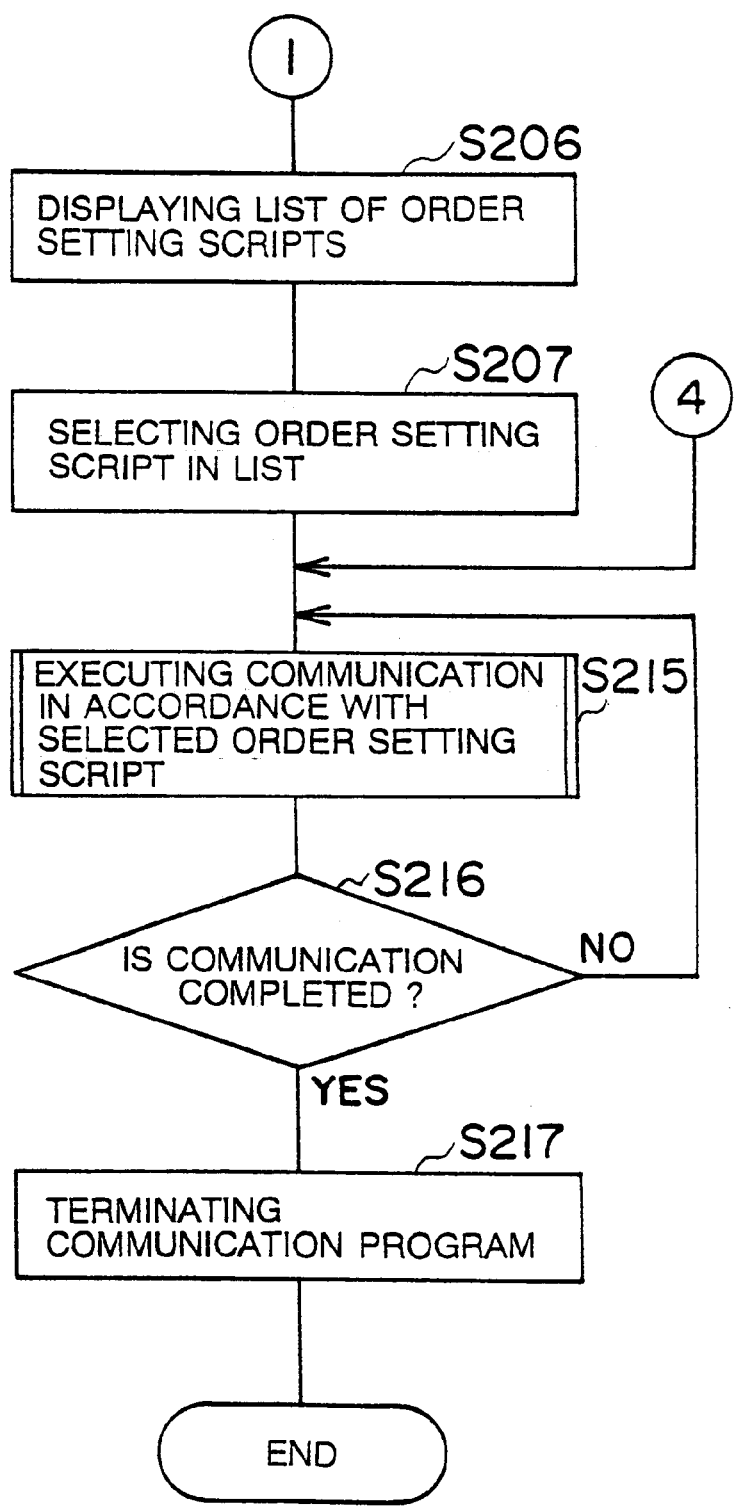
FIG. 8 is a flowchart showing a communication control process executed by the CPU 1 reading a communication program in FIG. 2.
Figure 9:
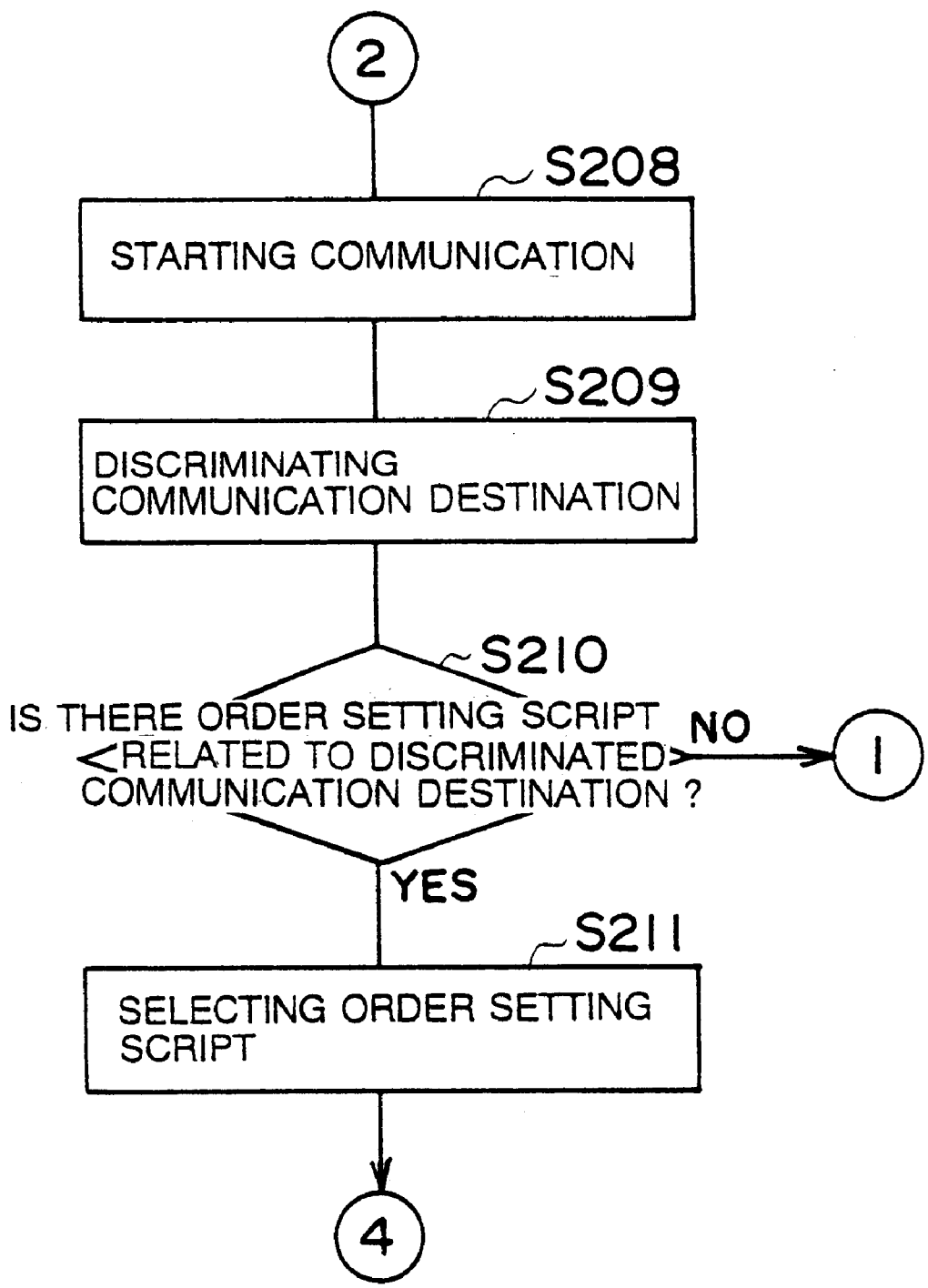
FIG. 9 is a flowchart showing a communication control process executed by the CPU 1 reading a communication program in FIG. 2.
Figure 10:
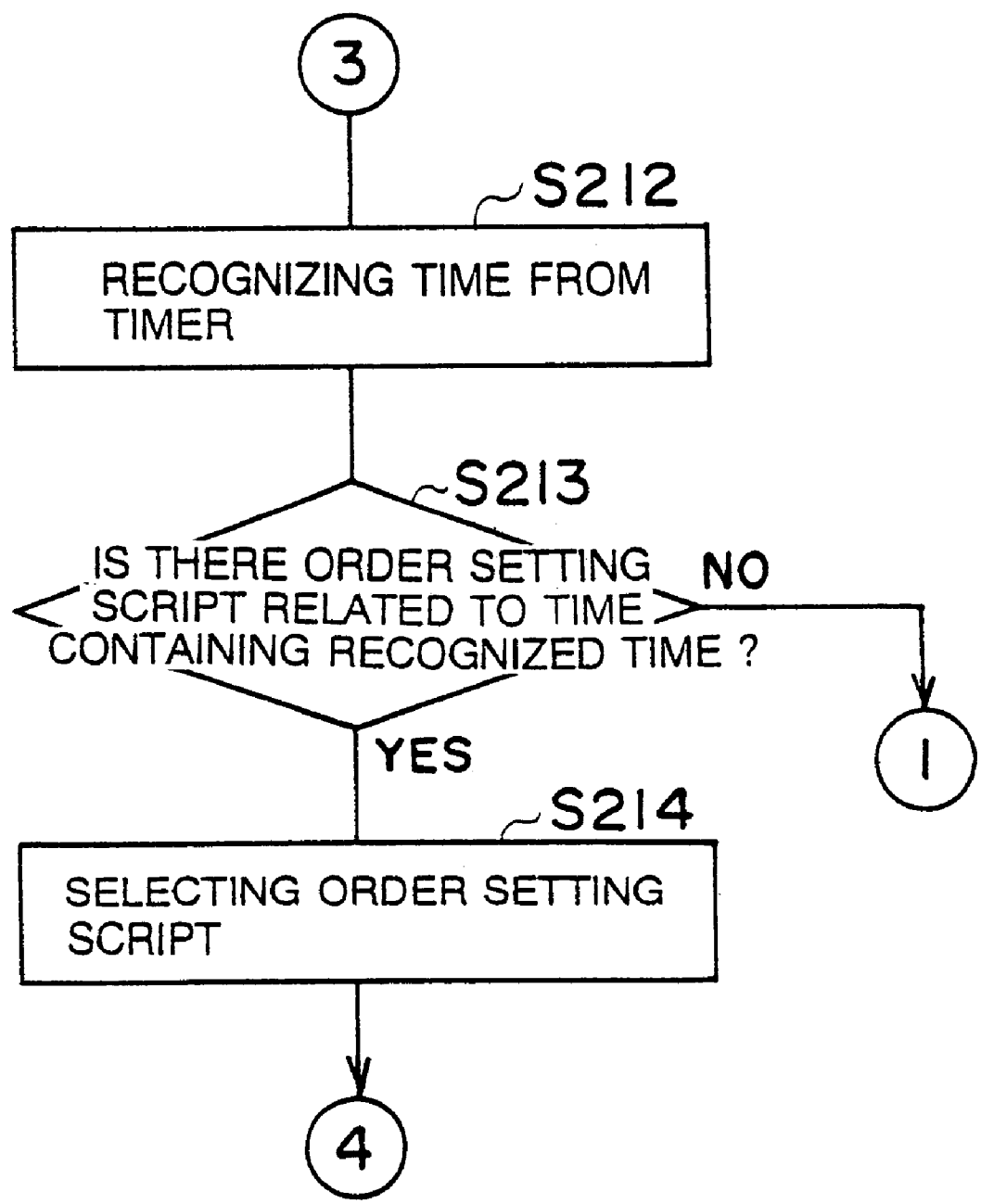
FIG. 10 is a flowchart showing a communication control process executed by the CPU 1 reading a communication program in FIG. 2.

FIG. 6 is a flowchart showing a selection criterion setting process executed by thee CPU 1 reading a selection criterion setting program 28. This selection criterion setting process starts by inputting a selection criterion setting start command through the keyboard 5.

In the S101 first executed after the selection criterion setting process starts, the CPU 1 checks whether the order setting scripts 41, 42, 43 . . . referred by the communication order referring process 25 while communicating are set so as to be selected by the user in accordance with the specific information inputted through the keyboard 5 by the user. The CPU 1 sets as "selection criterion=user" in the S102, and registers them in the selection criterion register 40 of the flash memory 4, when the user can select the order setting script. The CPU 1 terminates the selection criterion setting process after completing the S102. However, the CPU 1 advances the process to the S103 when it is not set that the user can select the order setting script.

In the S103, the CPU 1 checks whether the order setting scripts 41, 42, 43 . . . referred by the communication order referring process 25 in communication are set so as to be automatically selected in accordance with the communication destination based on the specific information inputted through the keyboard 5 by the user. The CPU 1 sets as "selection criterion=destination" in the S104, and registers them in the selection criterion register 40 of the flash memory 4, when the setting script is automatically set based on the communication destination. The CPU 1 terminates the selection criterion setting process after completing the S104. However, the CPU 1 advances the process to the S105 when it is not set that the order setting script is automatically set based on the communication destination.

In the S105, the CPU 1 checks whether the order setting scripts 41, 42, 43 . . . referred by the communication order referring process 25 while communicating are set so as to be automatically selected based on the time zone in accordance with the specific information inputted through the keyboard 5 by the user. The CPU 1 sets "selection criterion=time zone" in the S106, and registers them in the selection criterion register 40 of the flash memory 4, when the setting script is automatically set based on the time zone. The CPU 1 terminates the selection criterion setting process after completing the S106. However, the CPU 1 advances the process to the S105 when it is not set that the order setting script is automatically set based on the time zone.

In the S107, the CPU 1 checks whether the setting is finished or not. It is checked based on whether a finishing command is inputted or not through the keyboard 5 by the user. The CPU 1 returns the process to the S101 when no finishing command is inputted yet. However, the CPU 1 terminates the selection criterion setting process when a finishing command is inputted.

<Communication Program>

FIGS. 7 through 10 are flowcharts showing a main routine of a communication control process executed by the CPU 1 reading a communication program 24. This communication control process starts by inputting a communication start command through the keyboard 5.

In the S201 first executed after this communication control process starts, the CPU 1 starts the communication program 24.

In the next S202, the CPU 1 checks the selection criterion register 40 in the flash memory 4, and checks whether "selection criterion=user" is set or not. The CPU 1 advances the process to the S206 when "selection criterion=user" is set.

In the S206, the CPU 1 displays a list of all order setting scripts 41, 42, 43 . . . stored in the flash memory 4 on the liquid crystal display 6. In the next S207, the CPU 1 waits that the user inputs specific information through the keyboard 5, and selects one of the order setting scripts 41, 42, 43 . . . displayed on the liquid crystal display 6 in accordance with the inputted specific information. The CPU 1 advances the process to the S215 after completing the S207.

On the other hand, the CPU 1 advances the process to the S203 when not deciding that "selection criterion=user" is set in the S202. In the S203, the CPU 1 checks the selection criterion register 40 in the flash memory 4, and checks whether "selection criterion=destination" is set or not. The CPU 1 advances the process to the S208 when "selection criterion=destination" is set.

In the S208, the CPU 1 makes a call in according with a telephone number instructed by an application program not shown with any communication interface so as to execute a preliminary communication.

In the next S209, the CPU 1 discriminates the communication destination based on the preliminary communication of the S208. The CPU 1 finishes this preliminary communication when completing the discrimination.

In the next S210, the CPU 1 checks whether or not there is an order setting script related to the communication destination discriminated in the S209 in the flash memory 4. The CPU 1 advances the process to the S206 to when there is no order setting script related to the communication destination. In this case, the CPU 1, as above described, displays the list of the order setting scripts in the S206 and selects one of the order setting scripts in accordance with the specific information inputted by the user in the S207, and then advances the process to the step S215. However, the CPU 1, when judging that there is an order setting script related to the communication destination in the S210, selects an order setting script related to the communication destination (corresponding to the order setting information reading unit), and then advances the process to the S215.

The CPU 1 advances the process to the S204 when not deciding that "selection criterion=destination" is set in the S203. In the S204, the CPU 1 checks the selection criterion register 40 in the flash memory 4, and checks whether "selection criterion=time zone" is set or not. The CPU 1 advances the process to the S212 when "selection criterion+ time zone" is set.

In the S212, the CPU 1 takes current time information from the timer 7, and recognizes a current time.

In the next S213, the CPU 1 checks whether there is or not an order setting script related to a time zone containing the current time recognized in the S212 in the flash memory 4. The CPU 1 advances the process to the S206 when there is no order setting script related to a time zone containing the current time. In this case, the CPU 1, as above described, displays the list of the order setting scripts in the S206 and selects one of the order setting scripts in accordance with the specific information inputted by the user in the S207, and then advances the process to the S 215. However, the CPU 1, when judging that there is an order setting script related to a time zone containing the current time in the S213, selects one of order setting scripts related to a time zone containing the current time (corresponding to order setting information reading unit), and then advances the process to the S215.

Figure 11:
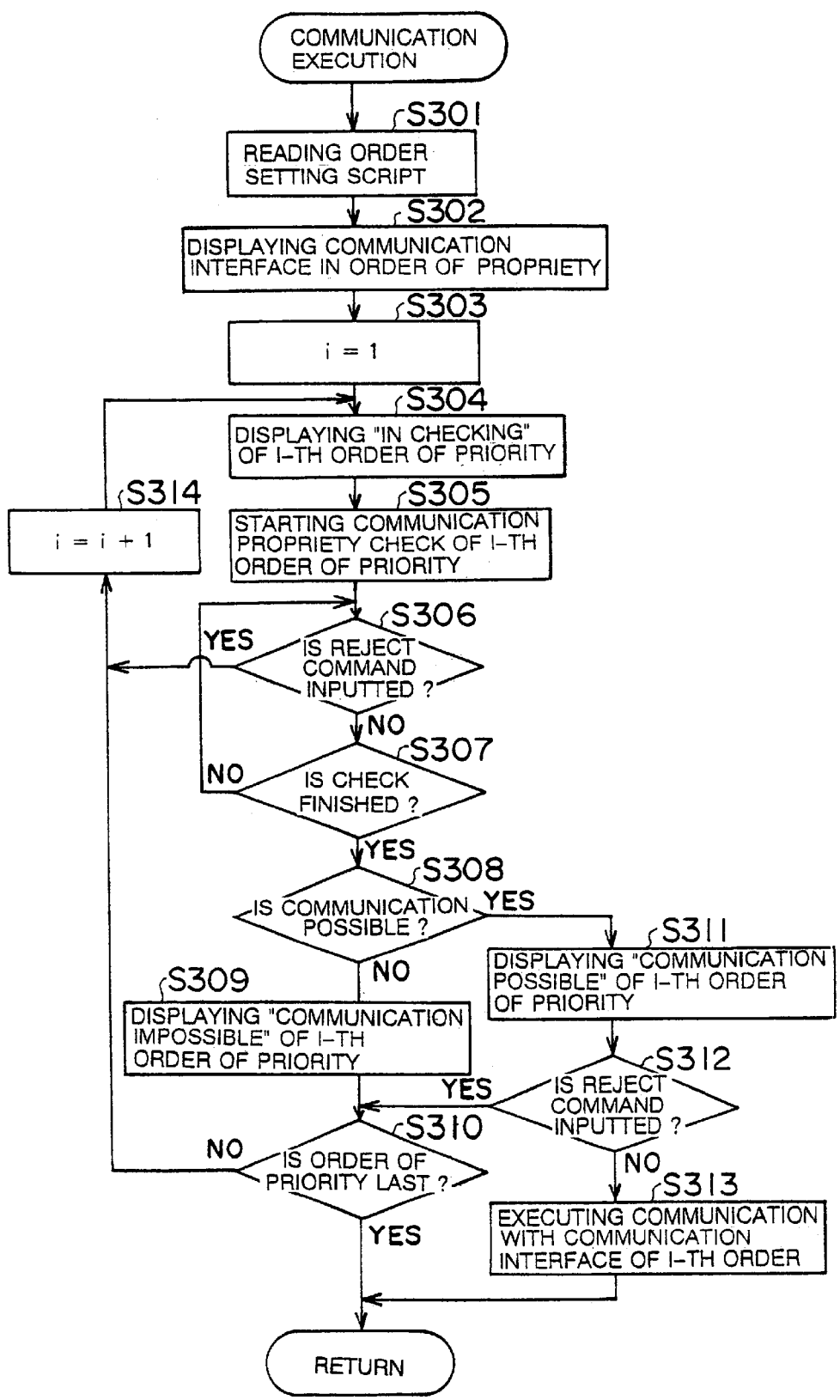
FIG. 11 is a flowchart showing a communication execution process subroutine executed by S215 in FIG. 8.

In the S215, the CPU 1 executes a communication execution process in accordance with the order setting script selected in the S207, the S211 or the S214. FIG. 11 is a flowchart showing a communication execution process subroutine executed in the S215.

In the first S301 after entering the communication execution process subroutine, the CPU 1 reads the order setting script selected in the S207, the S211 or the S214 from the flash memory 4 (corresponding to the order setting information reading unit).

In the S302, the CPU 1 arranges the communication interfaces 11 through 15 in accordance with the orders of priority set by the order setting script read in the S301, and displays them on the liquid crystal display 6 (corresponding to a display unit).

In the next S303, the CPU 1 initially sets "1" for a variable i showing the order of priority of the communication interfaces 11 through 15 to be checked.

Then, the CPU 1 executes a loop process of the S304 through the S310 in order to check whether or not it is possible to communicate by the communication interfaces 11 through 15 in accordance with the order of priority.

In the first S304 after entering the loop process, the CPU 1 displays a comment showing that the communication interface of the i-th order of priority is being checked, adjacent to the displayed name of that communication interface on the liquid crystal display 6 (corresponding to the display control unit).

In the next S305, the CPU 1 begins to check whether the communication interfaces 11 through 15 of the i-th order of priority can communicate or not (corresponding to the communication propriety judgement part).

In the S306, the CPU 1 checks whether or not a reject command (reject information) is inputted through the keyboard 5 by the user. The CPU 1, when the reject command is inputted, gives up the communication by one of the communication interfaces 11 through 15 of the i-th order of priority and increases the variable i, and then returns to the S304 in order to check the communication interface of the next order of priority.

However, the CPU 1, when judging that no reject command is inputted, checks whether check for the communication interface of the i-th order of priority is finished or not in the S307. The CPU 1, when the check is not yet finished, returns the process to the S306, and when the check is finished, advances the process to the S308.

The CPU 1, when judging that it is impossible for the communication interface of the i-th order of priority to communicate as a result of the above check, advances the process to the S309 from the S308. In the S309, the CPU 1 displays a comment showing "communication impossible" for the communication interface of the i-th order of priority adjacent to the displayed name of the communication interface of the i-th order of priority on the liquid crystal display 6 (corresponding to the display control unit). After completing the S309, the CPU 1 advances the process to the S310.

On the other hand, the CPU 1, when judging that it is possible for the communication interface of the i-th order of priority to communicate as a result of the above check, advances the process to from the S308 to the S311. In the S311, the CPU 1 displays a comment showing "communication possible" for the communication interface of the i-th order of priority adjacent to the displayed name of the communication interface of the i-th order of priority on the liquid crystal display 6 (corresponding to the display control unit).

In the next S312, the CPU 1 checks whether or not a reject command (reject information) is inputted through the keyboard 5 by the user. When a reject command is inputted, the CPU 1 gives up the communication by the communication interface of the i-th order of priority, and advances the process to the S310.

In the S310, the CPU 1 checks whether or not the i-th order of priority at this stage is the last order set by the order setting script read in the S301. The CPU 1, when not judging that the i-th order of priority at this stage is the last order, increases the variable "i" in the S314, and then returns the process to the S314 in order to check one of the communication interfaces 11 through 15 of the next order of priority.

When it is judged that a communication is possible by one of the communication interfaces 11 through 15, to be checked (of the i-th order of priority at this stage) as a result of repeating the loop process, and when no reject command is inputted by the user, the CPU 1 advances the process to the S313 from the S312. In the S313, the CPU 1 decides to communicate by using one of the communication interfaces 11 through 15 of the i-th order of priority, and starts driver program corresponding to one of the communication interfaces 11 through 15 of the i-th order of priority. Then, with one of the communication interfaces 11 through 15 of the i-th order of priority, a call is made to networks to be connected with the communication interfaces 11 through 15 in accordance with the telephone number instructed by the not shown application program. Then, when a line is established by this calling, the CPU 1 executes the communication with a destination in accordance with the instruction from the application program through one of the communication interfaces 11 through 15 of the i-th order of priority and the communication line (corresponding to the communication execution unit).

(Operation of Communication Apparatus)

Explanations will be given of the operation of the communication apparatus of the above described embodiment. It is assumed that the user prepares two order setting scripts shown in FIGS. 3 and 4 with tie order setting program 27 and stores them in the flash memory 4. In this case, when the user sets "selection criterion=time zone" with the selection criterion setting program 28, the order setting script of "Internet Connection (1)" shown in FIG. 3 is automatically selected and the communication interfaces 11 through 15 are checked and selected based on the order of priority according to the order setting script of "Internet Connection (1)" in the usual working time (AM 9:00 through PM 5:00), and the order setting script of "Internet Connection (2)" shown in FIG. 4 is automatically selected and the communication interfaces 11 through 15 are checked and selected based on the order of priority according to the order setting script of "Internet Connection (2)" in the time zone except the working time (PM 5:00 through AM 0:00). Accordingly, during the working time zone (AM 9:00 through PM 5:00), the high speed and high quality data communication can be performed by giving priority over an ISDN line introduced to the user's place of work, and during the at-home time (PM 5:00 through AM 0:00), the low-charge data communication can be performed by giving priority over the home analog line. Further, regardless of that one order setting script is once selected, when it is impossible to communicate with one of the communication interfaces 11 through 15 of the high order of priority, the communication interfaces 11 through 15 of the lower order of priority are sequentially checked and one of the communication interfaces 11 through 15 capable of communicating is selected sequentially, and when it is inconvenient to communicate with the communication interface 11 through 15 of the high order of priority (for example, when an user is a member of a provider (2) and the user accesses to the provider (2) during a recess in the working time via the user's portable telephone 4), the user can select one of suitable communication interfaces 11 through 15 in accordance with the actual situation by inputting the reject command.

Moreover, when it is not suitable to select the order setting script based on the time zone, for example, when the working time becomes irregular, the user resets as "selection criterion=destination". When the user is a member of the provider (1) in the name of the user's place of work and accesses to the provider (1), the order setting script of "Internet Connection (1)" shown in FIG. 3 is automatically selected and the communication interfaces 11 through 15 are checked and selected in the order of priority in accordance with the order setting script of "Internet Connection (1)". When the user is a member of the provider (2) in the name of the user and accesses to the provider (2), the order setting script of "Internet Connection (2)" shown in FIG. 4 is automatically selected and the communication interfaces 11 through 15 are checked and selected in accordance with the order of priority in accordance with the order setting script of "Internet Connection (2)". Thus, the user, when accessing to the provider (1), can use the high-speed and high-quality data communication by giving priority over the ISDN line introduced to the user's place of work, and, when accessing to the provider (2), can use the low-cost data communication by giving priority over the analog line at home. Further, regardless of that one order setting script is selected, when it is impossible to communicate with one of the communication interfaces 11 through 15 of the high order of priority, the communication interfaces of the lower order of priority are sequentially checked and one of the communication interfaces 11 through 15 capable of communicating is selected in order, and when it is inconvenient to communicate with one of the communication interfaces 11 through 15 of the high order of priority, the user can select a suitable communication interface among the communication interfaces 11 through 15 in accordance with the actual situation by inputting the reject command.

Moreover, the user can determine easily to input a reject command or not since information showing that one or more of the communication interfaces 11 through 15 to be checked are "being checked" is displayed on the liquid crystal display 6 while checking the communication interfaces 11 through 15.

The user can also know conditions of each communication interface 11 through 15 and lines linked thereto easily, and can know one of the communication interfaces 11 through 15 being used for communication, since information showing that the communication interface 11 through 15 to be checked are "communication possible" or "communication impossible" after checking.

This invention being thus described, it will be obvious that same may be varied in various ways. Such variations are not to be regarded as departure from the spirit and scope of the invention, and all such modifications would be obvious for one skilled in the art intended to be included within the scope of the following claims.

What is claimed is:

1. A communication apparatus for communication with a plurality of communication destinations comprising:

a plurality of communication interfaces communicating with each of said communication destinations;

a storage storing a plurality of order setting information, each of said plurality of order setting information for setting order of priority of said communication interfaces in relation to each of said communication destinations;

an order setting information reading unit reading said order setting information in relation to a specified communication destination from said storage, when communicating with said specified communication destination;

a communication propriety judging unit sequentially judging whether a communication can be executed with each of said communication interfaces in the order of priority set by said order setting information read by said order setting information reading unit until said communication propriety judging unit finds an available communication interface; and a communication execution unit executing the communication with said specified communication destination by using the communication interface first judged by the communication propriety judging unit as communication possible.

2. A communication apparatus according to claim 1, further comprising:

a display displaying information of communication interfaces for which the order of priority is set by said order setting information read by said order setting information reading unit.

3. A communication apparatus according to claim 1, further comprising:

a display displaying information of said communication interface under judging by said communication propriety judging unit.

4. A communication apparatus according to claim 1, further comprising:

a display displaying information said communication interface judged by the communication propriety judging unit as communication impossible to said communication destination.

5. A communication apparatus according to claim 1, further comprising:
a display displaying information said communication interface judged by the communication propriety judging unit as communication possible to said communication destination.

6. A communication apparatus according to claim 1, further comprising:
an input device for a reject request of judging by said communication propriety judging unit during said communication propriety judging;
wherein said communication property judging unit stops a judgment for the communication interface when the reject information is inputted through said input device.

7. A communication apparatus according to claim 1, further comprising:
an input device for a reject request of a communication with said communication interface judged by said communication propriety judging unit as communication possible;
wherein said communication execution unit stops the communication with said communication interface judged as communication possible when the rejection information is inputted through said input device, and said communication propriety judging unit judges said communication interface of the next order of priority.

8. A communication apparatus for communication with communication destination comprising:
a plurality of communication interfaces for communicating with said communication destination;
a storage storing a plurality of order setting information, each of said plurality order setting information for setting order of priority of said communication interfaces in relation to each time zones in which a communication is executed;
a timer indicating a current time;
an order setting information reading unit reading said order setting information in relation to a time zone including the current time indicated by said timer from said storage;
a communication propriety judging unit judging whether a communication can be executed with each of said communication interfaces in the order of priority set by said order setting information read by the order setting information reading unit; and
a communication execution unit executing the communication with said communication destination by using the communication interface first judged by the communication propriety judging unit as communication possible.

9. A communication apparatus according to claim 8, further comprising:
a display displaying information of communication interfaces for which the order of priority is set by said order setting information read by said order setting information reading unit.

10. A communication apparatus according to claim 8, further comprising:
a display displaying information of said communication interface under judging by said communication propriety judging unit.

11. A communication apparatus according to claim 8, further comprising:

a display displaying information said communication interface judged by the communication propriety judging unit as communication impossible to said communication destination.

12. A communication apparatus according to claim 8, further comprising:
a display displaying information said communication interface judged by the communication propriety judging unit as communication possible to said communication destination.

13. A communication apparatus according to claim 8, further comprising:
an input device for a reject request of judging by said communication propriety judging unit during said communication propriety judging; wherein said communication propriety judging unit stops a judgment for the communication interface when the reject information is inputted through said input device.

14. A communication apparatus according to claim 8, further comprising
a input device for a reject request of a communication with said communication interface judged by said communication propriety judging unit as communication possible;
wherein said communication execution unit stops the communication with said communication interface judged as communication possible when the rejection information is inputted through said input device, and said communication propriety judging unit judges said communication interface of the next order of priority.

15. A communication interface selecting method of selecting a communication interface among a plurality of communication interfaces for communicating with a plurality of communication destinations, said method comprising:
storing, in a storage, a plurality of order setting information, each of said plurality of order setting information for setting order of priority of said communication interfaces in relation to each communication destinations;
reading, when communicating with a specified communication destination, said order setting information related to the specified communication destination from the storage;
judging whether a communication is possible by sequentially using each of the communication interfaces in the order of priority set by the read order setting information until finding an available communication interface; and
selecting the communication interface first judged as communication possible to communicate with the specified communication destination.

16. A communication interface selecting method of selecting a communication interface among a plurality of communication interfaces for communicating with communication destination, said method comprising:
storing, in a storage, a plurality of order setting information, each of said plurality of order setting information for setting order of priority of said communication interfaces in relation to each time zones in which a communication is performed;
reading said order setting information related to a time zone including a current time from the storage;
judging whether a communication is possible by using each of the communication interfaces in the order of priority set by the read order setting information; and;

selecting the communication interface first judged as communication possible to communicate with said communication destination.

17. A computer-readable storage medium storing a program controlling a computer to perform communicating with a plurality of communication destinations by a plurality of communication interfaces, and comprising a process of:

storing, in a storage, a plurality of order setting information, each of said plurality of order setting information for setting order of priority of said communication interfaces in relation to each communication destinations;

reading, when communicating with a specified communication destination, said order setting information related to the specified communication destination from the storage;

judging whether a communication is possible by sequentially using each of the communication interfaces in the order of priority set by the read order setting information until finding an available communication interface; and selecting the communication interface first judged as communication possible to communicate with the specified communication destination.

18. A computer-readable storage medium storing a program controlling a computer to perform communication with communication destination by a plurality of communication interfaces, and comprising a process of:

storing, in a storage, a plurality of order setting information, each of said plurality of order setting information for setting order of priority of said communication interfaces in relation to each time zones in which a communication is performed;

reading said order setting information related to a time zone including a current time from the storage;

judging whether a communication is possible by using each of the communication interfaces in the order of priority set by the read order setting information; and selecting the communication interface first judged as communication possible to communicate with said communication destination.

19. A communication controller for communicating with a plurality of communication destinations by controlling a plurality of communication interfaces comprising:

an order setting information reading unit reading order setting information for setting order of priority of said communication interfaces in relation to said a destination, when communicating with said specified communication destination;

a communication propriety judging unit sequentially judging whether a communication can be executed with each of said communication interfaces in the order of priority set by said order setting information read by said order setting information reading unit until said communication propriety judging unit finds an available communication interface; and a communication control unit controlling the communication with said specified communication destination by using the communication interface first judged by the communication propriety judging unit as communication possible.

20. A communication controller for communicating with communication destination by controlling a plurality of communication interfaces comprising:

an order setting information reading unit reading order setting information for setting order of priority of said communication interfaces in relation to a time zone including a current time;

a communication propriety judging unit sequentially judging whether a communication can be executed with each of said communication interfaces in the order of priority set by said order setting information read by the order setting information reading unit until said communication propriety judging unit finds an available communication interface; and a communication control unit controlling the communication with communication destination by using the communication interface first judged by the communication propriety judging unit as communication possible.

21. A communication interface selecting method of selecting a communication interface among a plurality of communication interfaces for communicating with a plurality of communication destinations, said method comprising:

reading, when communicating with a specified communication destination, order setting information for setting order of priority of said communication interfaces in relation to the specified communication destination;

judging whether a communication is possible by sequentially using each of the communication interfaces in the order of priority set by the read order setting information until finding an available communication interface; and selecting the communication interface first judged as communication possible to communicate with the specified communication destination.

22. A communication interface selecting method of selecting a communication interface among a plurality of communication interfaces for communicating with communication destination, said method comprising:

reading order setting information for setting order of priority of said communication interfaces in relation to a time zone including a current time;

judging whether a communication is possible by sequentially using each of the communication interfaces in the order of priority set by the read order setting information until finding an available communication interface; and selecting the communication interface first judged as communication possible to communicate with said communication destination.

23. A computer-readable storage medium storing a program controlling a computer to perform communicating with a plurality of communication destinations by a plurality of communication interfaces, and comprising a process of:

reading, when communicating with a specified communication destination, order setting information for setting order of priority of said communication interfaces in relation to the specified communication destination;

judging whether a communication is possible by sequentially using each of the communication interfaces in the order of priority set by the read order setting information until finding an available communication interface; and selecting the communication interface first judged as communication possible to communicate with the specified communication destination.

24. A computer-readable storage medium storing a program controlling a computer to perform communicating with communication destination by a plurality of communication interfaces, and comprising a process of:

reading said order setting information for setting order of priority of said communication interfaces in relation to a time zone including a current time;

judging whether a communication is possible by sequentially using each of the communication interfaces in the order of priority set by the read order setting information until finding an available communication interface; and selecting the communication interface first judged as communication possible to communicate with said communication destination.

* * * * *

UNITED STATES PATENT AND TRADEMARK OFFICE
CERTIFICATE OF CORRECTION

PATENT NO.    : 6,393,031 B1
DATED         : May 21, 2002
INVENTOR(S)   : Hiroshi Isomura It is certified that error appears in the above-identified patent and that said Letters Patent is hereby corrected as shown below:

<u>Column 15,</u>
Line 14, no new paragraph.

<u>Column 16,</u>
Line 15, begin a new paragraph after "wherein".

<u>Column 19,</u>
Line 3, delete "said".

Signed and Sealed this

Twenty-second Day of October, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO. : 6,393,031 B1
DATED : May 21, 2002
INVENTOR(S) : Hiroshi Isomura

It is certified that error appears in the above-identified patent and that said Letters Patent is hereby corrected as shown below:

Column 16,
Line 21, delete "a input device for a reject request of a communication" and insert -- an input device for a reject request of a communication --.

Column 17,
Lines 49-50, delete "communication interfaces in relation to said a destination," and insert -- communication interfaces in relation to a specified communication destination, --

Signed and Sealed this

Twenty-first Day of September, 2004

JON W. DUDAS
*Director of the United States Patent and Trademark Office*